(12) United States Patent
Noel et al.

(10) Patent No.: US 11,528,988 B2
(45) Date of Patent: Dec. 20, 2022

(54) SEPARATION SYSTEMS, DEVICES AND METHODS

(71) Applicant: Georgia Tech Research Corporation, Atlanta, GA (US)

(72) Inventors: Alexis Noel, Atlanta, GA (US); David Hu, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 798 days.

(21) Appl. No.: 16/191,382

(22) Filed: Nov. 14, 2018

(65) Prior Publication Data

US 2019/0142151 A1  May 16, 2019

Related U.S. Application Data

(60) Provisional application No. 62/585,651, filed on Nov. 14, 2017.

(51) Int. Cl.
*A01K 13/00* (2006.01)
*A46B 9/02* (2006.01)
*A46B 5/06* (2006.01)

(52) U.S. Cl.
CPC .............. *A46B 9/028* (2013.01); *A01K 13/00* (2013.01); *A46B 5/06* (2013.01); *A46B 9/023* (2013.01); *A46B 2200/1093* (2013.01)

(58) Field of Classification Search
CPC ........ A01K 13/00; A01K 13/002; A46B 5/06; A46B 9/023; A46B 9/028; A46B 2200/1093; A46D 1/0238
USPC .................................................. 119/601, 600
See application file for complete search history.

(56) References Cited

U.S. PATENT DOCUMENTS

| | | | |
|---|---|---|---|
| 6,258,044 B1 * | 7/2001 | Lonky | A46B 3/18 600/569 |
| D893,111 S * | 8/2020 | Michaelson | D30/158 |
| D895,909 S * | 9/2020 | Yokoyama | D30/158 |
| 2013/0055963 A1 * | 3/2013 | Salter | A01K 13/002 119/601 |
| 2015/0101544 A1 * | 4/2015 | Ablow | A01K 13/002 119/600 |

* cited by examiner

*Primary Examiner* — Yvonne R Abbott-Lewis
(74) *Attorney, Agent, or Firm* — Troutman Pepper Hamilton Sanders LLP; Ryan A. Schneider

(57) ABSTRACT

A brush-like device that adapts to tangles in hair and allows for easy removal of hair post-groom using uniquely shaped, anisotropic papillae not unlike those found on a feline tongue.

22 Claims, 15 Drawing Sheets

FIG. 5A  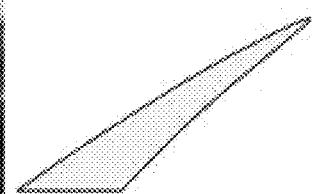
FIG. 5B 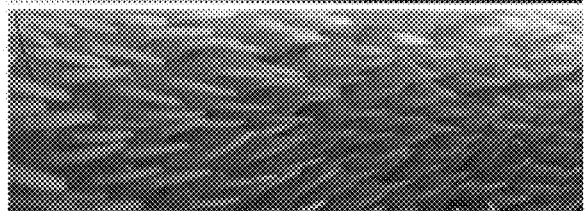 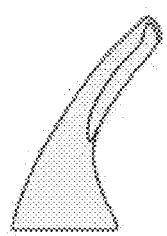
FIG. 5C 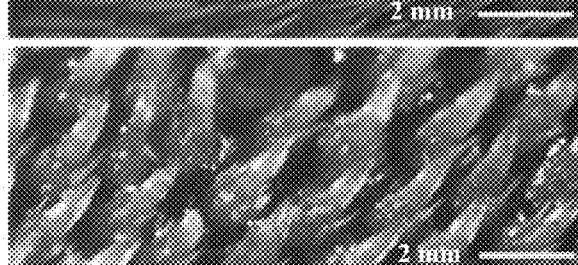 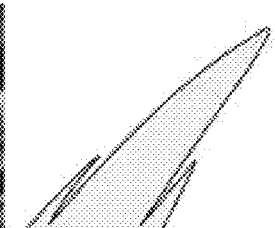
FIG. 5D  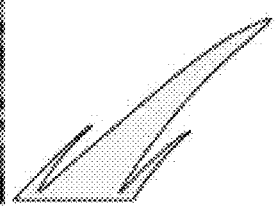
FIG. 5E 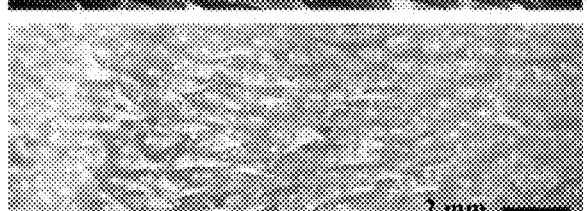 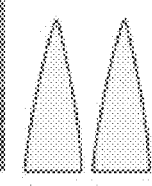
FIG. 5F  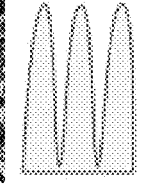

FIG. 7A  FIG. 7B

SEPARATION SYSTEMS, DEVICES AND METHODS

STATEMENT REGARDING FEDERALLY SPONSORED RESEARCH

This invention was made with government support under Contract Number PHY1255127, awarded by National Science Foundation. The Government has certain rights in the invention.

BACKGROUND OF THE INVENTION

1. Field of the Invention

The present invention relates generally to separation systems, devices and methods, and more particularly to a brushing device that upon use with hair for example, provides frictional anisotropy with backward-facing spines exhibiting self-cleaning properties post-groom.

2. Description of Related Art

Cats are the world's most popular pet, with over 74 million household cats in the United States alone. While not off stalking prey, cats can spend up to 24% of their awake time grooming. Cats groom to remove loose fur and fleas, redistribute hydrophobic oils, regulate body temperature, and improve circulation. Grooming is also used as a sign of affection between familiar cats.

The cat tongue is covered in an array of keratin spines called papillae. These backward-facing sharp spines have long been thought to assist with grooming and ripping meat off bones.

The earliest known comb is said to date from 8000 BC, carved from animal bone in Syria. Since then, the fundamental shape of the comb has not changed. There have been many attempts to modify the shape of the comb to reduce hair pullout pain, increase blood flow to the scalp and provide easy hair removal from the brush.

It is thus an intention of the present invention to dramatically enhance the separation properties of convention systems, devices and methods with an innovative brush design.

BRIEF SUMMARY OF THE INVENTION

Briefly described, in an exemplary form, the present invention is a separation device comprising a base substrate (with a range of flexibility through and including rigid) and arcuate spines, each extending from the base substrate and terminating in a spine tip.

The base substrate can have a modulus of elasticity within a relatively large range that provides for the base substrate to operate as intended.

The arcuate spines can have a modulus of elasticity within a relatively large range that provides for the arcuate spines to operate as intended.

The arcuate spines can be backward-facing.

The relationship between the base substrate and the arcuate spines can provide a frictionally anisotropic device.

The separation device can further comprise a wetting agent. The wettability of the base substrate can be higher than the arcuate spines.

The arcuate spine density can be varied.

The arcuate spines can be embedded in the base substrate to many depths to operate as intended.

The arcuate spines can be shaped as papillae. The arcuate spines can be shaped as filiform papillae.

Briefly described, in another exemplary form, the present invention is a method of separating a material comprising moving a base substrate with arcuate spines through the material, wherein the base substrate has an appropriate modulus of elasticity of, and wherein the arcuate spines, each extending from the base substrate and terminating in a spine tip, have an appropriate modulus of elasticity.

The material can comprise strands of hair.

Moving the base substrate with arcuate spines can comprise a cycle comprising extension of the base substrate with arcuate spines, lateral expansion and stiffness of the base substrate, sweep of the base substrate with arcuate spines through the material, and retraction of the base substrate with arcuate spines in a retraction orientation.

The method can further comprise wetting the base substrate with arcuate spines.

Moving the base substrate with arcuate spines can comprise a plurality of cycles.

These and other objects, features and advantages of the present invention will become more apparent upon reading the following specification in conjunction with the accompanying drawing figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A-F illustrate a tongue's surface projections, or papillae, range over three orders of magnitude in length. Papillae photographs (left) and schematics (right) of (A) nestling penguin *Aptenodytes fosteri*, (B) domestic cat *Felis catus*, (C) cow *Bos taurus*, (D) deer *Odocoileus virginianus*, (E) pig *Sus domesticus* and (F) frog *Lithobates catesbeianus*, arranged from the longest to shortest papillae. Rigid papillae (A-D) tilt towards the throat, whereas soft papillae (E, F) do not.

FIGS. 17-19 illustrate the interaction between papillae and soft tongue tissue.

FIG. 19 is a graph illustrating load vs. displacement for the papillae tensile test. The data follows an exponential trend due to the nonlinearity of the soft tissue at high deformation. The FEA determined similar load vs. displacement results.

DETAIL DESCRIPTION OF THE INVENTION

Figures 1, 2, 3, 4:
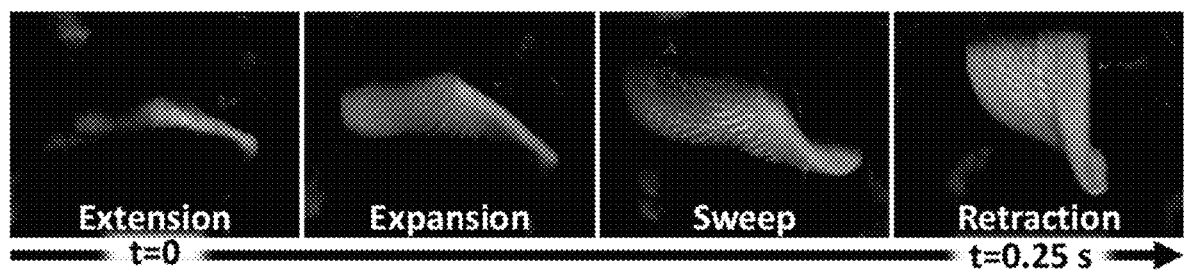
FIGS. 1-4 illustration of a cat tongue. The four phases of cat grooming: tongue extension (FIG. 1), tongue lateral expansion (FIG. 2), sweeping of the tongue through fur (FIG. 3), and lastly retraction of the tongue in a V-shape curl (FIG. 4).

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

In an exemplary embodiment, the present invention utilizes relatively uniquely shaped, anisotropic papillae not unlike those found on a feline tongue to develop a brush-like device that is able to wet hairy media, adapts to tangles in hair and allows for easy removal of hair post-groom.

High speed videography of the common domesticated cat *Felis catus* grooming its fur was observed. There appear to be four phases of a single grooming sweep. As shown in FIGS. 1-4, there is an extension of the tongue (FIG. 1), lateral expansion and stiffening of the tongue tissue (FIG. 2), a full sweep of the tongue through the fur (FIG. 3), and finally retraction of the tongue in a V-shape curl (FIG. 4). It was found that the tongue moves through the fur at an average of 350 mm/s, with a single lick lasting on average 0.25 s. As the tongue retracts from the fur, the papillae spines are nearly vertical. During curling and stiffening of the tongue tissue, the spines were observed to both rotate and protrude away from the tissue.

FIGS. 5A-F illustrate a tongue's surface projections, or papillae, range over three orders of magnitude in length. Papillae photographs (left) and schematics (right) of (A) nestling penguin *Aptenodytes fosteri*, (B) domestic cat *Felis catus*, (C) cow *Bos taurus*, (D) deer *Odocoileus virginianus*, (E) pig *Sus domesticus* and (F) frog *Lithobates catesbeianus*, arranged from the longest to shortest papillae. Rigid papillae (A-D) tilt towards the throat, whereas soft papillae (E, F) do not.

Figure 6:
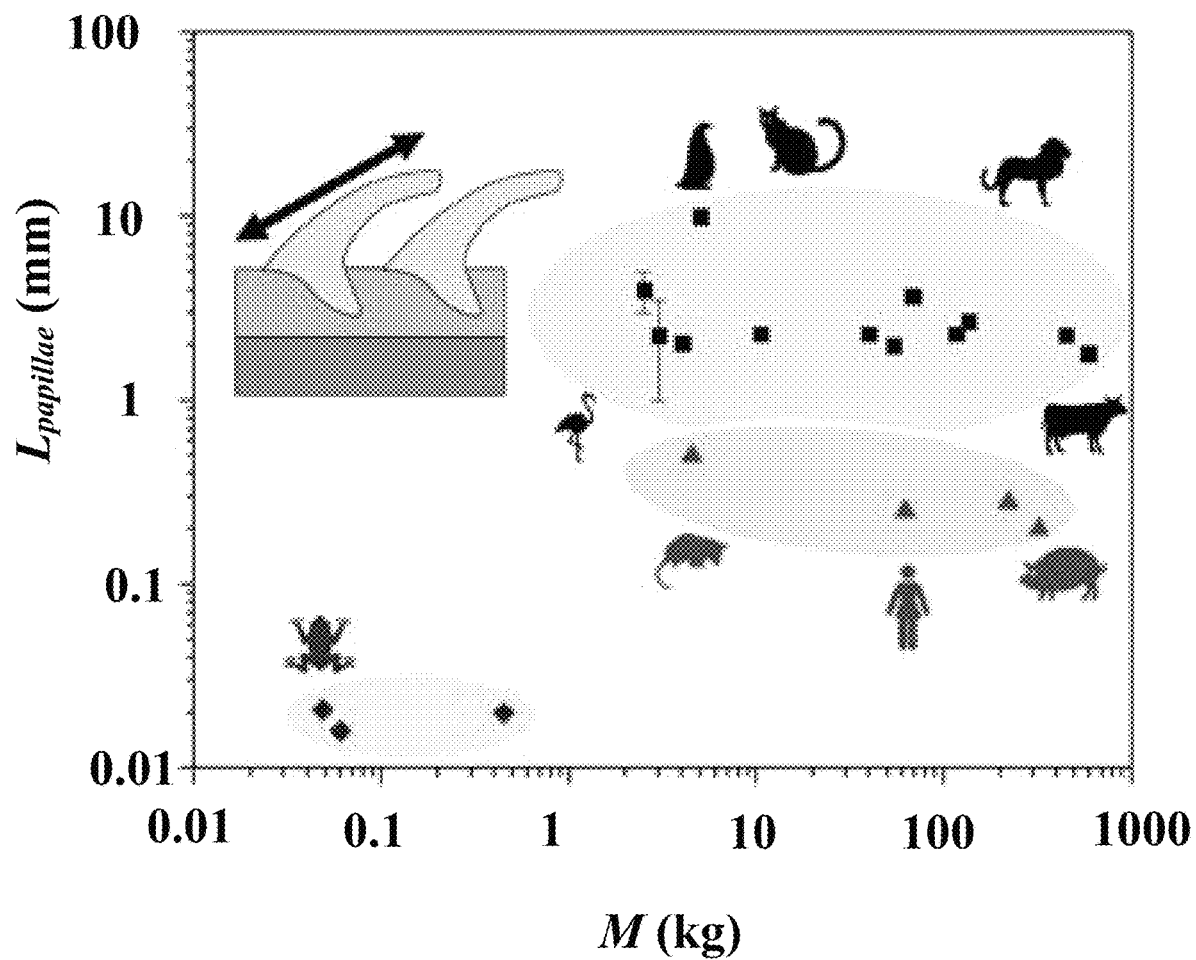
FIG. 6 is a graph illustrating the relationship between papillae length and body mass.

FIG. 6 illustrates the relationship between papillae length and body mass. Large, rigid papillae (squares) greater than 1 mm are used for grip and tissue penetration. Soft papillae smaller than 1 mm are used for holding saliva on the tongue to enhance food saturation (triangles) and adhesion (diamonds). Papillae length $L_{papillae}$ measured from tongue surface to papilla tip.

Figure 7:
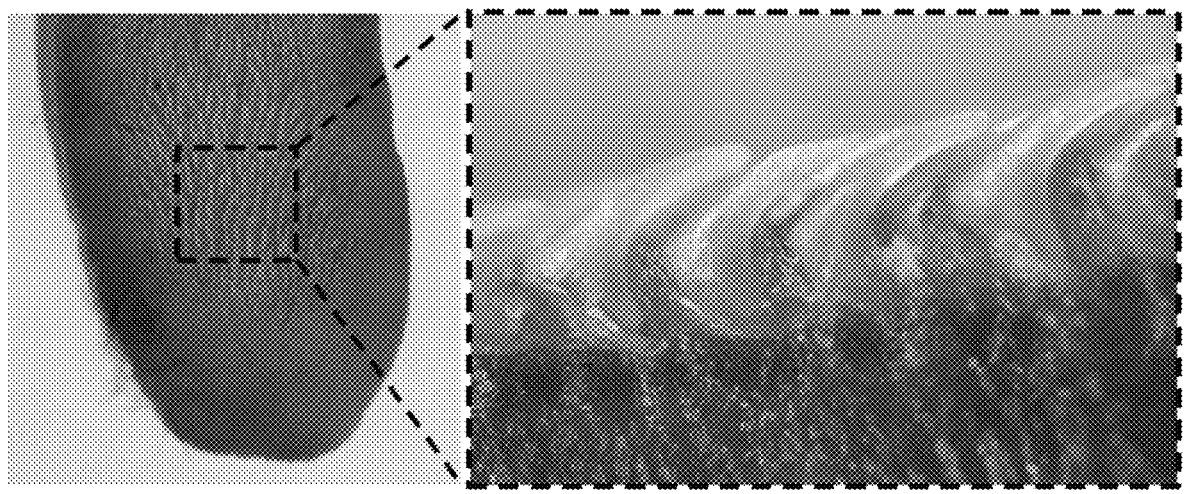
FIGS. 7A-B illustrates spine geometry as a cross-sectional slice of a cat tongue. The spines are on average 1.3 mm in length from root to tip.

A tongue from a domestic cat *Felis catus* was collected and placed in a micro-CT scanner to generate a 3D model. Another tongue was sliced lengthways to measure depth and curvature of the papillae (FIG. 7). The papillae are embedded in the soft tissue to an average depth of 0.9 mm. From the images, it was determined that papillae density was 0.2 papillae/mm$^2$.

Figure 8:
FIG. 8 is a tiger papilla dyed with food coloring.
Figure 9:
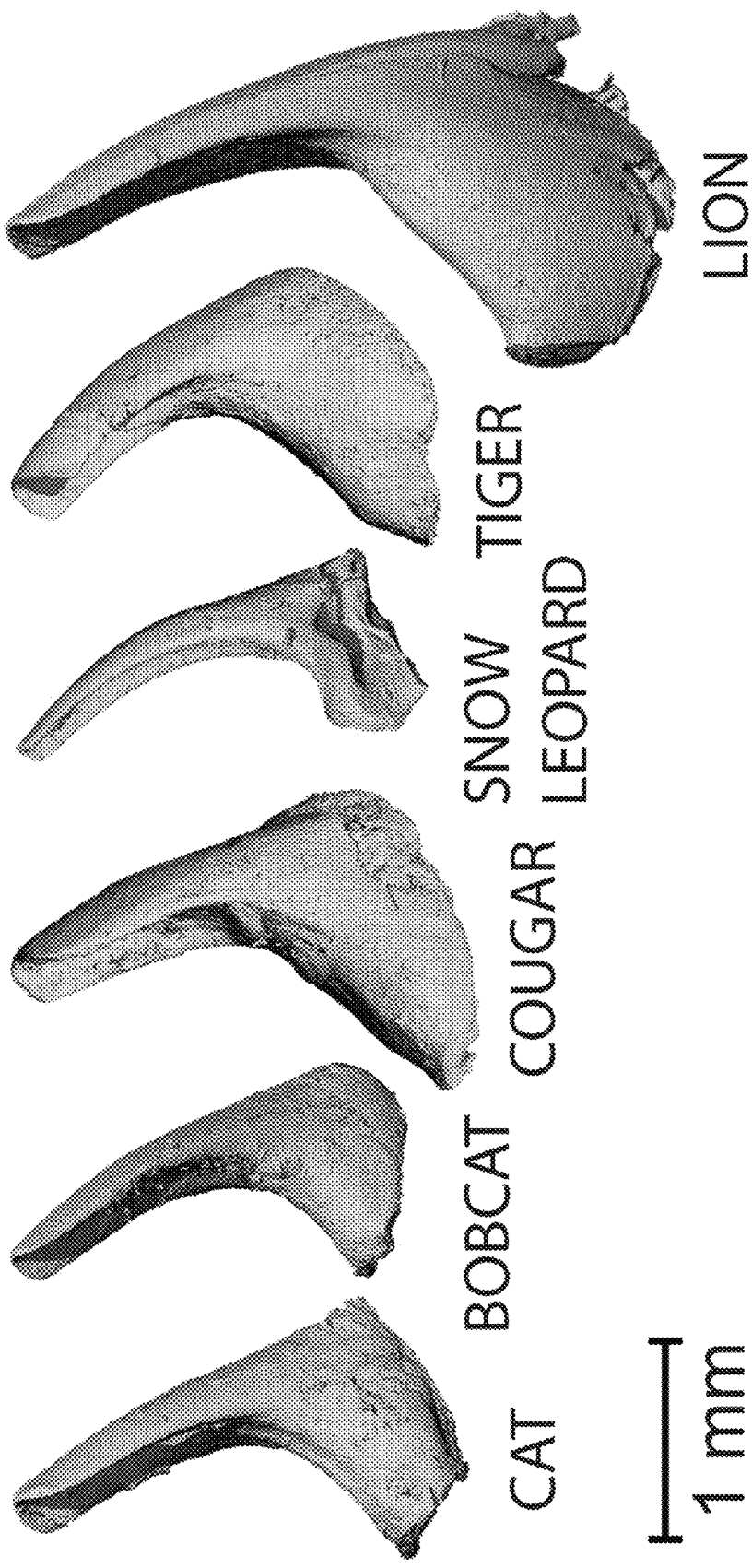
FIGS. 9A-F illustrate papillae from six different cats.

As discussed, the cat tongue is covered in sharp, rear-facing spines called papillae whose precise function is a mystery. The tongues of six species of cats were examined, from domestic cat to lion, a span of over 30-fold in weight. The papillae of these cats each comprise a fluidic communication system to the tip of the papillae (a hollow cavity-like design) that spontaneously wicks saliva from the mouth and then releases it onto hairs (see FIG. 8, which is a tiger papillae dyed with food coloring, and FIGS. 9A-F, papillae from the six cats). The unique shape of the cat's papillae inspires innovative ways to clean complex hairy surfaces.

Figure 10:
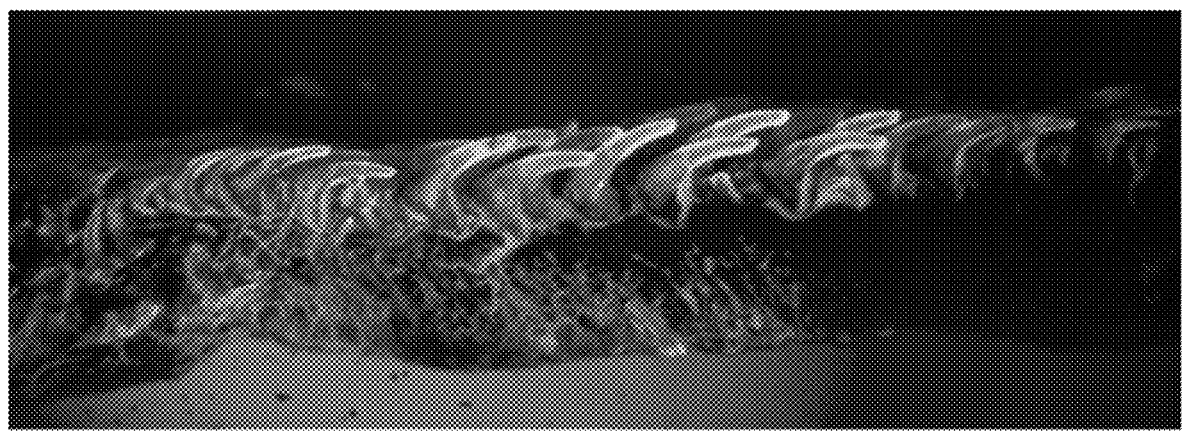
FIGS. 10-13 illustrate a cat tongue and a testing prototype. Cat tongue spines when the tissue is straight (FIG. 10), cat tongue spines when curled (FIG. 11), and the cat tongue mimic, when a silicone substrate is straight (FIG. 12) and curled (FIG. 13).
Figure 11:

In investigating the present invention, a brush was developed to measure the forces involved in grooming. FIGS. 10-11 show a cut-away view of the cat tongue, highlighting the streamlining of the papillae. FIGS. 10-11 illustrate a slice of a domestic cat tongue, illuminated using UV dye and a black light.

Figure 12:
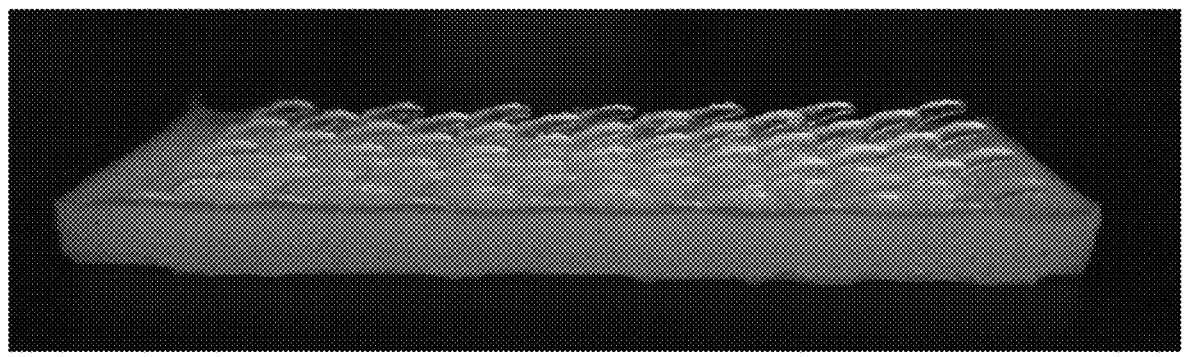
Figure 13:
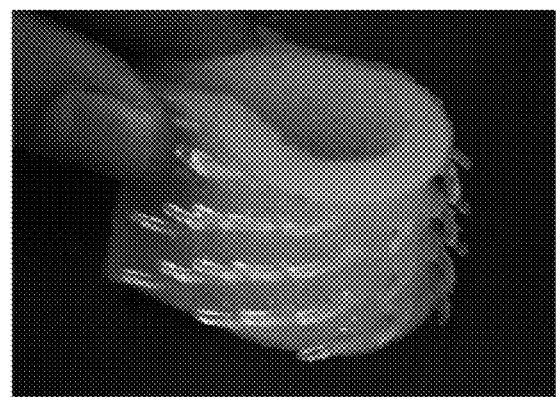

An exemplary cat tongue mimic was developed (using 3D printing), which is shown FIGS. 12-13, which displays similar properties to the cat tongue tissue. The variability of papillae angle of attack through fur was investigated, as was its resulting force, in a series of tests. FIGS. 12-13 shows the brush developed, built at 400% scale of the domestic cat tongue by using 3D-models of the domestic cat papillae. Note that the flexible substrate allows both the tongue and the brush to conform to curved surfaces. The brush of FIGS. 12-13 displayed flexibility similar to the cat tongue.

A cat tongue mimic was prepared to measure grooming forces through faux fur samples (FIGS. 12-13). Using dimensional data from the micro-CT images, the spines were 3D printed and embedded in a silicone substrate at a scale of 400% of the actual cat tongue. The grooming machine comprised a driven linear slide and an AMTI force plate.

Figure 14A:
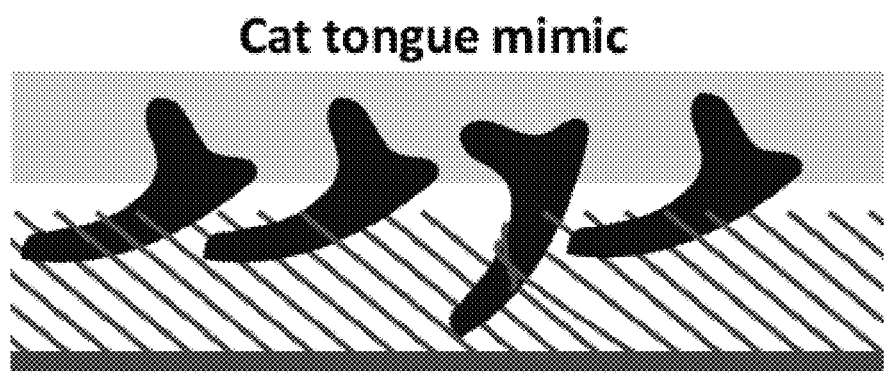
FIGS. 14A, B show the reaction force for the present cat tongue mimic pulled across a faux fur sample for seven trials. The colors represent the successive grooms (starting with red and proceeding in order of the colors of the rainbow). The inset shows the reaction forces normal to the fur sample. Peaks signify tangles, with steady state forces occurring after trial 3.

The cat tongue mimic was mounted to the linear slide and driven through a faux fur sample secured to the force plate. A vertical spine hairbrush, of comparable spine number and surface area, also was driven through the faux fur sample. The resulting forces for both the cat tongue mimic and hairbrush in the direction of grooming are shown in FIGS. 14A, B-15A, B.

Figure 14B:
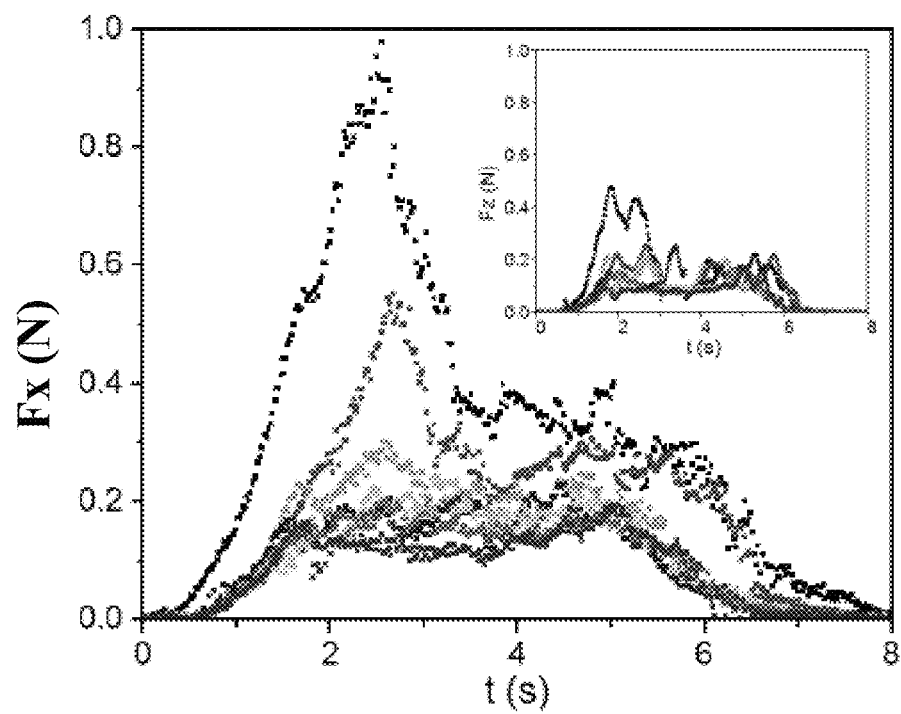
FIGS. 14-15 present grooming trials with the present cat tongue mimic and a hairbrush.
Figure 15A:
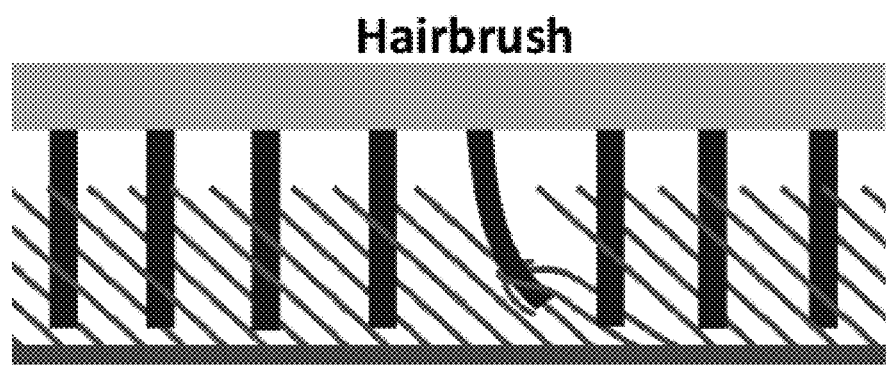
FIGS. 15A, B show the reaction force for a hairbrush pulled across a faux fur samples for seven trials, where the colors represent the successive grooms (starting with red and proceeding in order of the colors of the rainbow).
Figure 15B:
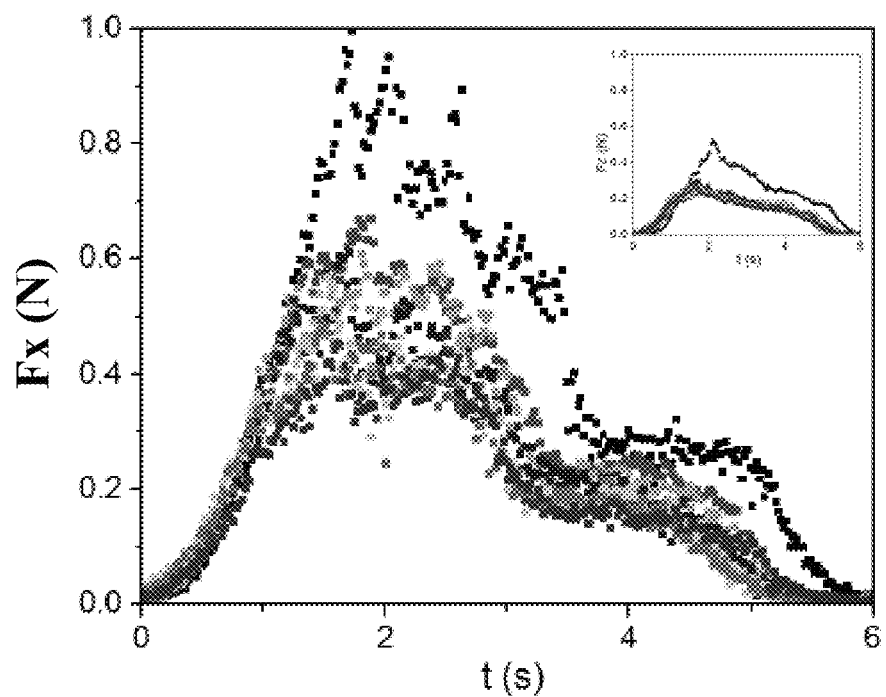

During the first few runs, both the cat tongue mimic and the hairbrush exhibit force spikes, with the forces equilibrating around the fourth run. The force equilibrium curves can be attributed to the compressive friction force, while the force spikes can be attributed to tangling. Inset in FIGS. 14B and 15B are the normal forces exerted by both cat tongue mimic and hairbrush, caused by fur being compressed downwards by the spines. The hairbrush reached normal force equilibrium at 0.2N, while the cat tongue mimic reached normal force equilibrium at 0.1N with periodic spikes. These spikes in force may be due to the papillae rotating and "digging in" to the fur base during translation.

Figure 16C:
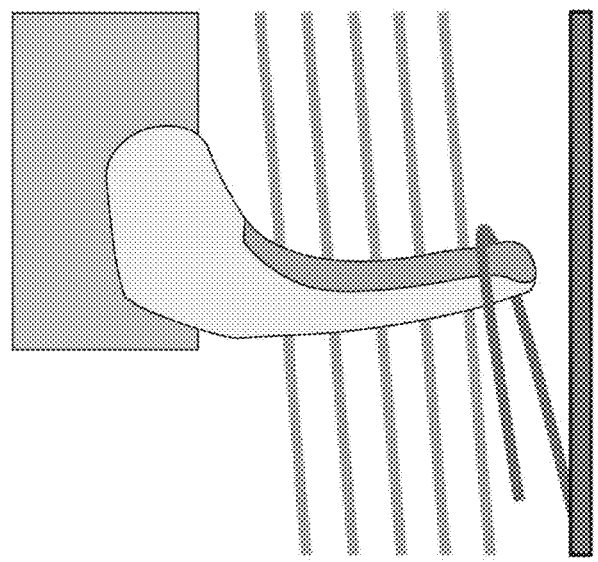
FIGS. 16A-C are schematics displaying a relaxed, streamlined papillae encountering a tangle (FIG. 16A), catching on a tangle (FIG. 16B), and rotating until perpendicular to the tongue (FIG. 16C).
Figure 16B:
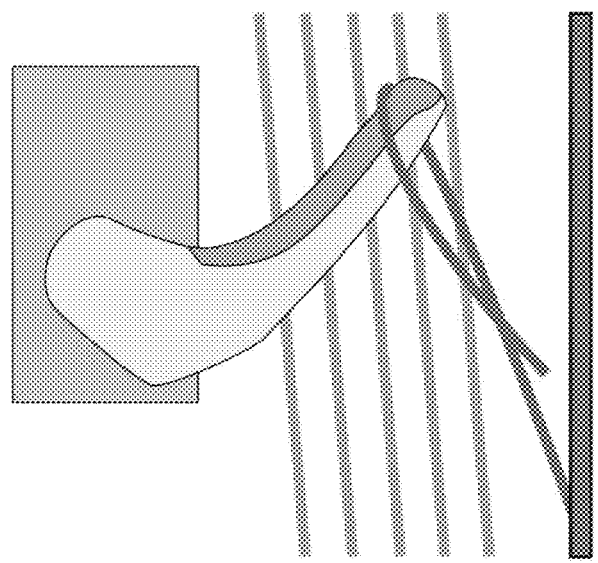
Figure 16A:
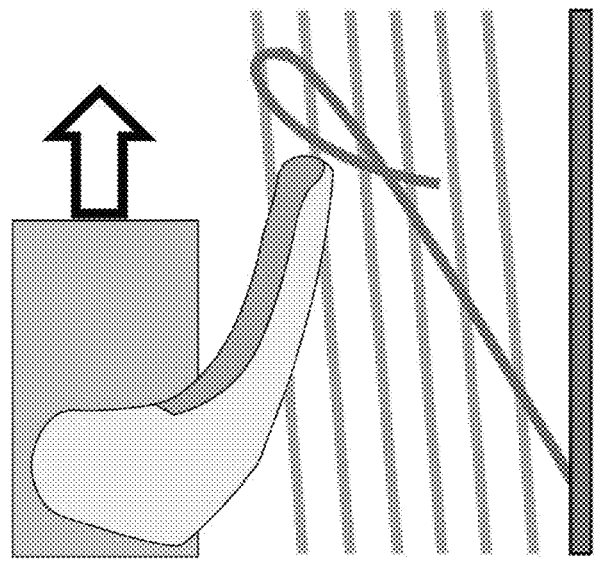

During the first three trials of both brushes, grooming force peaked at 0.6-1 N. This is likely due to the brushes encountering tangles within the fur. If a papilla catches on a tangle, it can rotate outwards to achieve a height of, for example, 9 mm, which increases the applied torque on the tangle (see, FIGS. 16A-C). FIGS. 16A-C are a schematic displaying a relaxed, streamlined papillae encountering a tangle (FIG. 16A), catching on a tangle (FIG. 16B), and rotating until perpendicular to the tongue (FIG. 16C).

In a real cat tongue, the deformation of the soft tissue causes the papillae to increase (exponentially) in resistive torque as they rotate outwards. After just four trials, the cat tongue mimic (prototype) reached a steady state grooming force of 0.2 N, less than half the steady state force of the human hairbrush. It is believed the decreased forces were due to the streamlined posture of the papillae: if a papilla did not encounter a tangle, it remained at a height of 4 mm, as shown in FIGS. 16A-C.

After multiple grooms, both prototype and human hairbrushes accumulated hairs. Because the human hairbrush's bristles are embedded into a relatively stiff matrix, hairs must be removed with an implement—such as tweezers. The exemplary cat tongue brush is much easier to clean because its papillae are streamlined. It was found that a swiping motion along the papillae direction removed nearly all the trapped fur in a single matted roll.

In developing the prototype, the nonlinear regime of the tongue tissue was measured, to be used for later finite element analyses (FEA). Next, a single papilla was removed from the cat tongue tissue and tested for Young's modulus in a Hysitron TriboIndenter nanoindenter. The Young's modulus of the papillae is 1.66-1.94±3% GPa, similar to human fingernails.

Figures 17A, 17B:
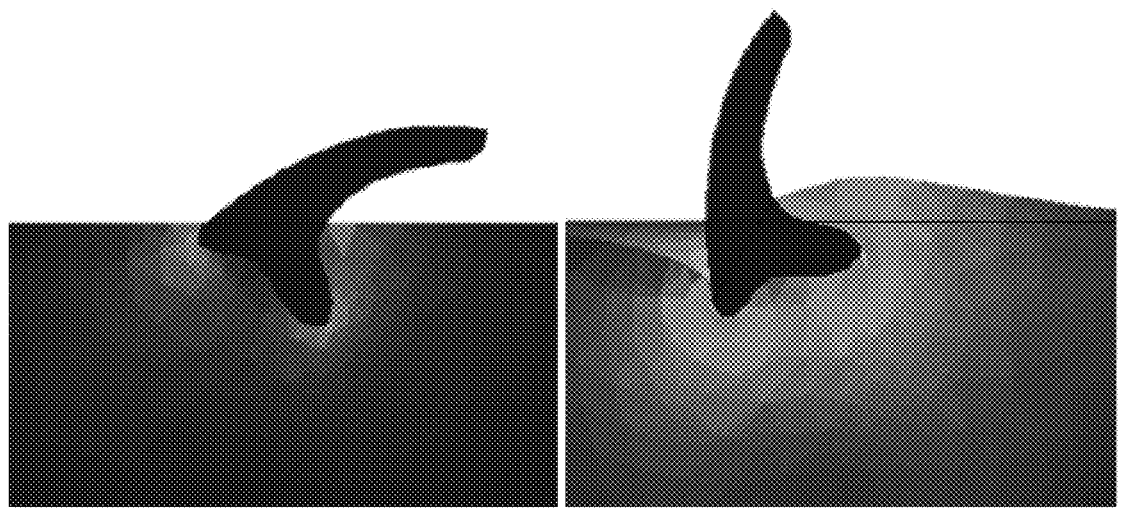
FIGS. 17A, B shows strain mapping in the soft tissue using finite element analysis (FEA). The material properties gathered from indentation tests were used in the analysis.

As the cat tongue brushes through fur, the papillae rotate and deflect, increasing the angle between spine tip and tissue surface. Using the material properties of papillae and tissue, a 3D model was generated and FEA performed to look at strains in the tissue (FIG. 17).

Figure 18A:
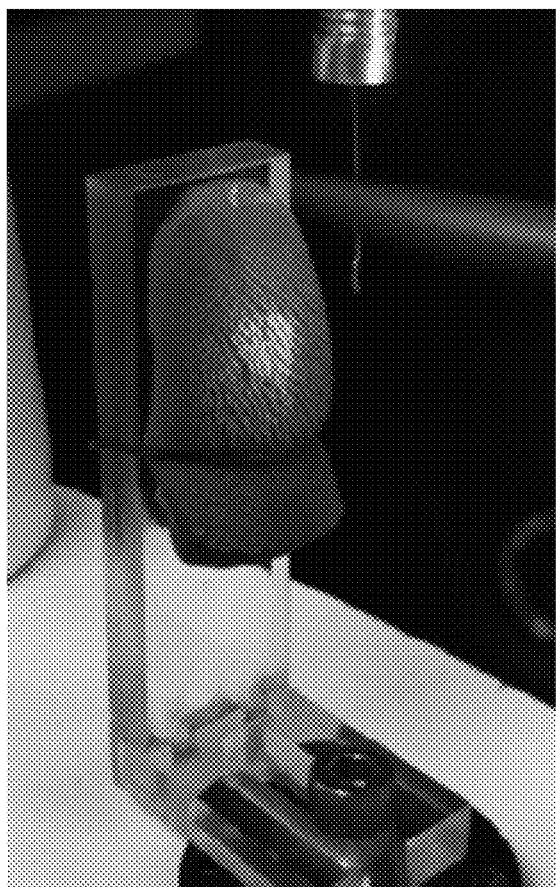
FIGS. 18A, B illustrates tensile test of a papillae. The papillae tip is pulled at a fixed rate of 0.02 mm/s, and resultant load is recorded. The papillae surface was coated in UV dye for enhanced videography.
Figure 18B:
Figure 19:
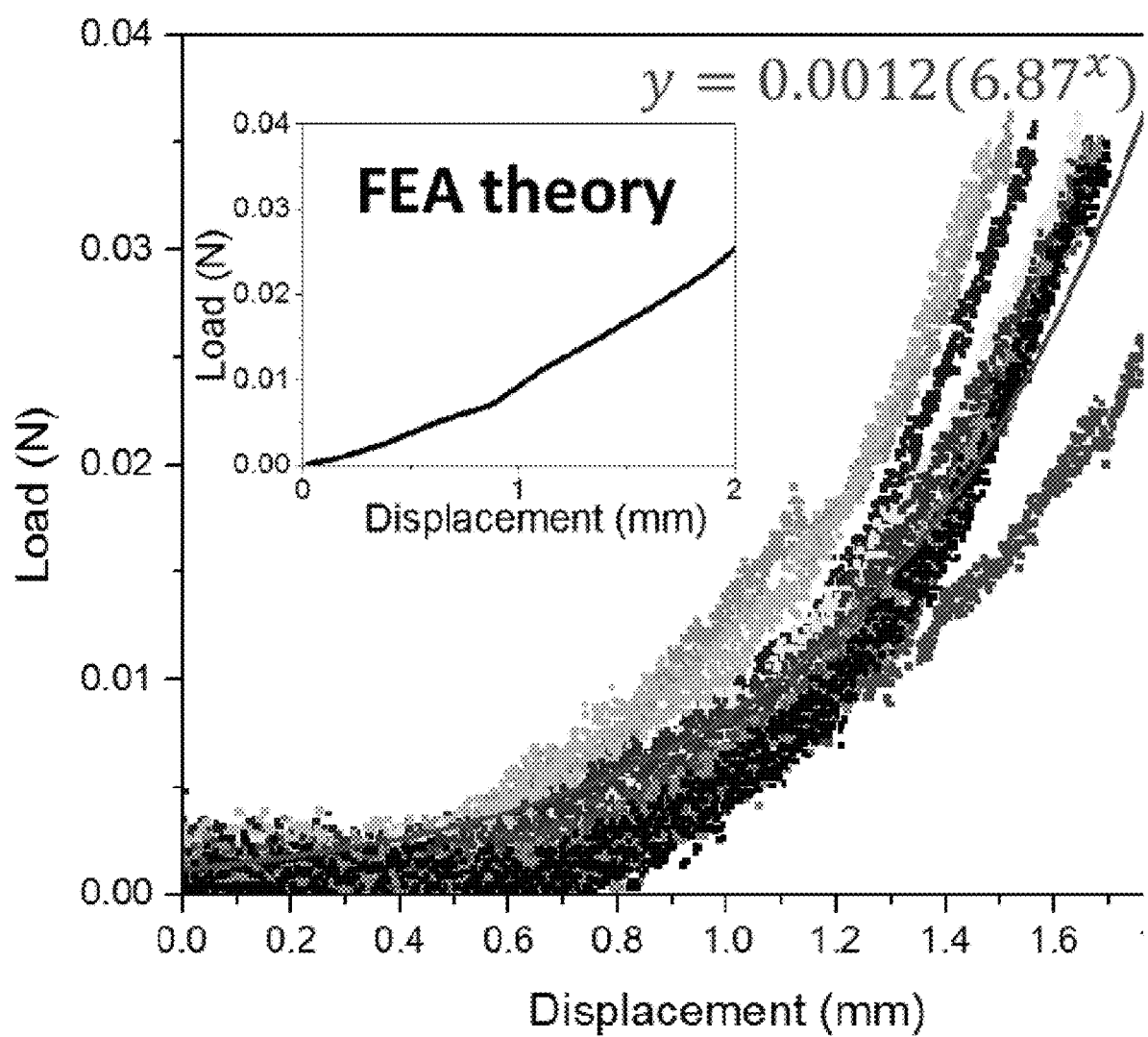

The force vs. deflection of an embedded papillae in the soft tissue was measured through tensile testing. A small loop is secured around a single spine tip and is pulled parallel to the tissue surface, rotating the spine along its tissue joint connection (FIGS. 18A-B). The force vs. displacement data of the spine tip is shown in FIG. 19, and follows an exponential trend as shown in the solid line. This deflection characteristic is similar to a progressive spring, often used to limit displacement. Using FEA, similar load vs. displacement results were determined (FIG. 19 (inset)).

During grooming, particulate and hairs are removed from the fur by both surface tension effects from saliva and papillae friction. The amount of particulate removed is dependent on the surface area in contact with saliva. The wettability of the tissue is higher than the papillae; therefore, surface tension effects are limited to interaction with the wet tissue at the base. As fur passes between the rows of papillae, the hairs are compressed together. This compression generates friction due to the normal forces, much like the classic problem of generating high friction by layering pages in a phone book.

Hair tangles can occur due to knotting or matting from dirt or excess oil. The force to detangle a matted section of hair is dependent on the contaminant. To detangle a knot, force must be applied to the knotted region to slide the individual strands apart. The force required to epilate a single human hair has been measured at 70 g, therefore the force applied to the tangle must not exceed 70 g times the number of hairs involved.

The force to break a human hair has been measured at around 75 g, slightly higher than epilation force. Many different knotting scenarios could occur during tangling, however if the case of two overlapping hair strands is considered, detangling can be simplified to a frictional resistance problem. The static friction coefficient of dry human hair from root to tip is around 0.75, while the dynamic friction coefficient is 0.15. The frictional force is dependent on the applied normal force of the spine on the knot; once the minimum static friction force is overcome, knot separation force drops.

A standard hairbrush spine can be modeled as a circular beam of radius r=0.45 mm, length l=10 mm with a point force applied at the end-tip. Most hairbrush spines are molded from nylon, which has a Young's modulus of 3 MPa. Beam bending in the elastic regime follows a linear relationship between applied end-tip force and displacement:

$$F = \frac{3E\pi r^3 \delta}{4l^3} \quad \text{(Eq. 1)}$$

Figure 20:
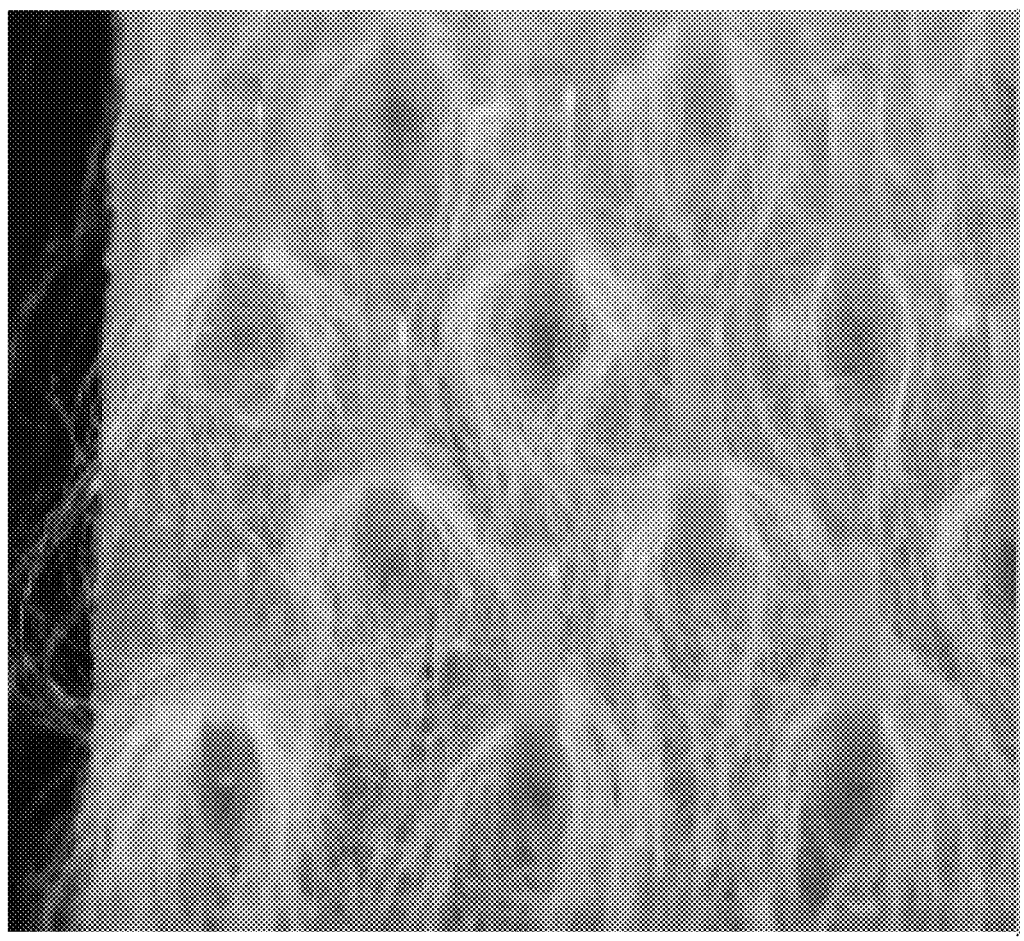
FIG. 20 shows the hair collected under the cat tongue mimic spines.

FIG. 20 shows the hair collected under the cat tongue mimic spines.

The cat tongue papillae are able to apply an exponential growth in force while maintaining grip on the knot with its concave face. If the static friction force is greater than the hair removal force, then the spine will grab and pull quickly. In the standard hairbrush, any deformation in the spine will cause the knot to slide up the curved face, losing contact.

The anisotropic nature of the cat tongue allows for ease of hair removal between the papillae. A single swipe on the papillae surface in the direction of the spines removes nearly all trapped hair. Removal of hair on a typical hairbrush is not as easy and requires plucking methods to fully clean the array.

Experimental Methods

A domestic cat Felis catus was used for high speed videography of grooming mechanics. A wet washcloth was brushed on the cat fur, and the tongue was filmed from the front using a Phantom Miro M110 high-speed camera at 500 fps. The video was analyzed using Tracker to determine tongue kinematics.

A Bose ElectroForce 3100 was used to perform probe indentation tests ex vivo on a cat tongue tissue sample. The cat tongue was collected and tested within 10 hours of death. A rigid, flat-ended cylindrical indenter of diameter 2 mm was used to probe the soft tissue on the underside of the tongue (no spines). Within the linear elastic solid regime, the force-displacement model for a cylindrical indenter is:

$$F = \frac{2ERS}{1-v^2} \quad (Eq. 2)$$

where E is Young's modulus, R is the indenter radius, S is displacement, and v is the Poisson's ratio. Poisson's ratio is assumed to be 0.5 for a perfectly elastic material. The Young's modulus was calculated from the force and displacement measured from the indenter.

A Hysitron TriboIndenter was used to perform probe indentation tests ex vivo on a cat tongue papillae sample. A papillae spine was removed from the tongue tissue and probed near the flat base.

A Bose ElectroForce 3100 was used to measure the spring constant of the joint between the papillae and tongue tissue. A loop of diameter 0.4 mm was created using copper wire. The tongue tissue was secured vertically to a plate and the wire loop was placed around the tip of a single papillae. The wire loop was then pulled vertically at a constant rate of 0.02 mm/s, and the corresponding force was measured. The tongue tissue surface was coated in an oil-based UV dye for visualization.

A Scanco micro-CT 50 was used to scan a cat tongue. In addition, a tissue sample was sliced and photographed to determine depth of papillae within the tissue. Using the scan and slice data, a 3D model of the cat tongue was generated using Solidworks. A Formlab 1+ stereolithography 3D printer was used to create the papillae mimics, scaled at 400%. Smooth-On Ecoflex 00-20 silicone, of measured Young's modulus 40 kPa, was poured into a mold. The papillae were then embedded in the mold prior to the silicone curing.

An artificial grooming mechanism was built using a linear-slide system and an AMTI HE6X6-1 force plate. A cat tongue mimic was sprayed with oil, to simulate the saliva layer, then secured to the linear slide and pulled at a constant rate of 10 mm/s. White faux fur fabric, with 3" fur length, was cut to a 1-inch square and secured to the force plate. As the cat tongue mimic was pulled through the fur fabric, the forces were measured. The mimic was only sprayed for the first trial.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A method of separating a target formed of components comprising moving a base substrate with arcuate spines through the target, comprising:
    extension of the base substrate with arcuate spines;
    lateral expansion and stiffness of the base substrate;
    sweep of the base substrate with arcuate spines through the target; and
    retraction of the base substrate with arcuate spines in a retraction orientation;
    wherein retraction of the base substrate comprises retraction of the base substrate with arcuate spines in a V-shaped curl.

2. The method of claim 1 further comprising transferring a wetting agent from at least a portion of the arcuate spines to the target.

3. The method of claim 1, wherein moving the base substrate with arcuate spines through the target comprises a plurality of moving cycles.

4. The method of claim 1, wherein the base substrate has a modulus of elasticity of from approximately 5.4-12.8 kPa.

5. The method of claim 1, wherein the arcuate spines, each extending from the base substrate and terminating in a spine tip, have a modulus of elasticity of from approximately 1.61-1.99 GPa.

6. The method of claim 1, wherein the target comprises strands of hair.

7. The method of claim 1 further comprising wetting the base substrate with arcuate spines.

8. The method of claim 1, wherein moving the base substrate with arcuate spines comprises a plurality of cycles.

9. The method of claim 8 further comprising wetting the base substrate with arcuate spines between each cycle.

10. The method of claim 1, wherein the base substrate has a modulus of elasticity of from approximately 5.4-12.8 kPa; and
    wherein the arcuate spines, each extending from the base substrate and terminating in a spine tip, have a modulus of elasticity of from approximately 1.61-1.99 GPa.

11. The method of claim 1, wherein the arcuate spines are backward-facing.

12. The method of claim 1, wherein the arcuate spine density is approximately 0.2 arcuate spine/mm$^2$.

13. The method of claim 1, wherein the arcuate spines are embedded in the base substrate to a depth of approximately 0.9 mm.

14. The method of claim 1, wherein the arcuate spines are shaped as papillae.

15. The method of claim 1, wherein the arcuate spines are shaped as filiform papillae.

16. The method of claim 1, wherein the relationship between the base substrate and the arcuate spines provides a frictionally anisotropic device.

17. The method of claim 1 further comprising wetting the base substrate with arcuate spines;
wherein the wettability of the base substrate is higher than the arcuate spines.

18. A method of separating a target formed of components comprising moving a base substrate with arcuate spines through the target, comprising:
extension of the base substrate with arcuate spines;
lateral expansion and stiffness of the base substrate;
sweep of the base substrate with arcuate spines through the target; and
retraction of the base substrate with arcuate spines in a retraction orientation;
wherein the relationship between the base substrate and the arcuate spines provides a frictionally anisotropic device.

19. The method of claim 18, wherein retraction of the base substrate comprises retraction of the base substrate with arcuate spines in a V-shaped curl.

20. The method of claim 18, wherein one or more of:
moving the base substrate with arcuate spines through the target comprises a plurality of moving cycles;
moving the base substrate with arcuate spines comprises a plurality of cycles and the method further comprises wetting the base substrate with arcuate spines between each cycle;
the base substrate has a modulus of elasticity of from approximately 5.4-12.8 kPa;
the arcuate spines, each extending from the base substrate and terminating in a spine tip, have a modulus of elasticity of from approximately 1.61-1.99 GPa;
the arcuate spine density is approximately 0.2 arcuate spine/mm$^2$;
the arcuate spines are embedded in the base substrate to a depth of approximately 0.9 mm;
the arcuate spines are backward-facing;
the arcuate spines are shaped as papillae;
the arcuate spines are shaped as filiform papillae;
the target comprises strands of hair;
the method further comprises transferring a wetting agent from at least a portion of the arcuate spines to the target;
the method further comprises wetting the base substrate with arcuate spines; and
the method further comprises wetting the base substrate with arcuate spines, wherein the wettability of the base substrate is higher than the arcuate spines.

21. A method of separating a target formed of components comprising moving a base substrate with arcuate spines through the target, comprising:
extension of the base substrate with arcuate spines;
lateral expansion and stiffness of the base substrate;
sweep of the base substrate with arcuate spines through the target;
retraction of the base substrate with arcuate spines in a retraction orientation; and
wetting the base substrate with arcuate spines;
wherein the wettability of the base substrate is higher than the arcuate spines.

22. The method of claim 21, wherein one or more of:
moving the base substrate with arcuate spines through the target comprises a plurality of moving cycles;
moving the base substrate with arcuate spines comprises a plurality of cycles and the method further comprises wetting the base substrate with arcuate spines between each cycle;
the base substrate has a modulus of elasticity of from approximately 5.4-12.8 kPa;
the arcuate spines, each extending from the base substrate and terminating in a spine tip, have a modulus of elasticity of from approximately 1.61-1.99 GPa;
the arcuate spine density is approximately 0.2 arcuate spine/mm$^2$;
the arcuate spines are embedded in the base substrate to a depth of approximately 0.9 mm;
the arcuate spines are backward-facing;
the arcuate spines are shaped as papillae;
the arcuate spines are shaped as filiform papillae;
the target comprises strands of hair;
retraction of the base substrate comprises retraction of the base substrate with arcuate spines in a V-shaped curl;
the relationship between the base substrate and the arcuate spines provides a frictionally anisotropic device;
the method further comprises transferring a wetting agent from at least a portion of the arcuate spines to the target; and
the method further comprises wetting the base substrate with arcuate spines.

\* \* \* \* \*